UNITED STATES PATENT OFFICE.

ROBERT SIMPSON BAXTER AND GEORGE DUNCAN MACDOUGALD, OF DUNDEE, COUNTY OF FORFAR, SCOTLAND.

PREPARING CATTLE FOOD.

SPECIFICATION forming part of Letters Patent No. 425,727, dated April 15, 1890.

Application filed June 12, 1889. Serial No. 314,012. (No specimens.) Patented in England November 2, 1888, No. 15,813; in France May 8, 1889, No. 198,062, and in Canada September 27, 1889, No. 50,177.

*To all whom it may concern:*

Be it known that we, ROBERT SIMPSON BAXTER and GEORGE DUNCAN MACDOUGALD, subjects of the Queen of Great Britain and Ireland, and residents of Dundee, in the county of Forfar, Scotland, have invented an Improvement in the Manufacture of Seed-Cake or Cattle Food from Cotton-Seed, (for which British Patent No. 15,813, dated November 2, 1888; Canadian Patent No. 50,177, dated September 27, 1889, and French Patent No. 198,062, dated May 8, 1889, have been obtained,) of which the following is a specification.

Our said invention has for its object to manufacture seed-cake or cattle food from cotton-seed in an improved and economical manner.

The cotton fibers, with which many varieties of cotton-seeds are ordinarily covered, render cake made from such seeds unsuitable for cattle food if the fibers are present therein in their natural condition, and numerous attempts have been made to remove the fibers from the seeds before making the seeds into cake or cattle food, the various processes and apparatus proposed for that purpose involving more or less expense and inconvenience. By our invention we convert or alter the fibers in a manner to render them innocuous when present in the seed-cake or cattle food. We do not do anything specially to remove the fibers, but may mention that a portion of them becomes detached in applying our process.

We may apply our process for rendering the fibers innocuous either to the unbroken cotton-seeds or to the husks separated from the kernels.

Our improvement in the manufacture of seed-cake or cattle food from cotton-seeds consists in employing in that manufacture cotton-seeds or cotton-seed husks, the fiber on which has been subjected to a process in which the fiber is first moistened with dilute sulphuric acid or other suitable acid or agent; secondly, is heated and dried, and, thirdly, is washed to remove soluble matters. The precise proportions of the acid or agent employed will vary in different cases and be dependent on the quantity of fiber on the seeds; but, by way of example, it may be stated that in operating on one hundred pounds of unbroken cotton-seeds of an average character—such, for example, as may have about three per centum, by weight, of adherent fibers—we mix from one to two pounds sulphuric acid of a strength of 110° Twaddell (or an equivalent quantity of another strength) with sufficient water to allow of the fibers on the seeds being uniformly moistened. In order to secure uniformity and completeness of the moistening process, we may subject the cotton-seed to mechanical stirring or agitation in any suitable apparatus. The heating and drying process may be effected in any convenient way, the time required being inversely in proportion to the strength of the acid. A temperature of 212° Fahrenheit is sufficient, if maintained long enough, to well dry the fibers. We have, however, found that higher temperature may be employed if care is taken not to expose the seed long enough to carbonize the fiber or injure the seed. By this heating and drying process the acid or agent is made to act on the fiber in a manner to alter or convert it into a substance which is innocuous when used as an ingredient in cattle food. While the proportion of acid or agent may be varied in different cases, we prefer to employ not more than what is sufficient to effect the desired alteration or conversion of the fiber. Any little superfluity of acid or other agent is, however, removed by the washing to which the seeds or husks are subjected before being used in making cattle food.

Among other acids or agents which may be employed we may mention nitric acid and hydrochloric acid; but we prefer to use sulphuric acid, larger quantities of the others being required and increased cost being occasioned by their use.

The mechanical operations for manufacturing seed-cake or cattle food are to be effected in the ordinary way, excepting that instead of employing cotton-seeds or cotton-seed husks, on which the fiber is in its natural condition or from which it has been removed, we employ cotton-seeds or cotton-seed husks having on them fiber altered or converted in the manner hereinbefore described. If desired, the material made from cotton-seed, as hereinbefore described, may be mixed with other suitable ingredients to form cattle food.

What we claim as our invention is—

The improvement in the art of making seed-cake or cattle food from cotton-seeds, consisting in first rendering innocuous the fiber on the seeds by treatment with an acid or like agent and subsequent washing and then making the seed so treated and with the altered fiber on it into seed-cake or cattle food, all substantially as described.

In testimony whereof we have signed our names to this specification in the presence of two subscribing witnesses.

ROBERT SIMPSON BAXTER.
GEORGE DUNCAN MACDOUGALD.

Witnesses:
CHARLES BAXTER,
*Horse Wynd, Dundee, Clerk.*
HORATIO T. BAXTER,
*Of 87 Commercial Street, Dundee, Solicitor.*